United States Patent
Venkatesh et al.

(10) Patent No.: US 7,464,201 B1
(45) Date of Patent: Dec. 9, 2008

(54) PACKET BUFFER MANAGEMENT APPARATUS AND METHOD

(75) Inventors: Narasimhan Venkatesh, Hyderabad (IN); Satya Rao, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 30 days.

(21) Appl. No.: 11/803,909

(22) Filed: May 16, 2007

Related U.S. Application Data (62) Division of application No. 10/680,660, filed on Oct. 6, 2003, now Pat. No. 7,296,100.

(51) Int. Cl.
  *G06F 3/00* (2006.01)
  *G06F 13/00* (2006.01)
  *G06F 15/173* (2006.01)

(52) U.S. Cl. .............. 710/52; 710/53; 710/54; 710/56; 710/33; 709/238

(58) Field of Classification Search ............... None
  See application file for complete search history.

(56) References Cited

U.S. PATENT DOCUMENTS

| | | | |
|---|---|---|---|
| 4,849,968 A | 7/1989 | Turner | |
| 4,864,560 A | 9/1989 | Quinquis et al. | |
| 5,016,248 A | 5/1991 | Kudoh | |
| 5,633,865 A | 5/1997 | Short | |
| 5,797,043 A | 8/1998 | Lewis et al. | |
| 6,021,132 A | 2/2000 | Muller et al. | |
| 6,343,072 B1 | 1/2002 | Bechtolsheim et al. | |

*Primary Examiner*—Alan Chen
(74) *Attorney, Agent, or Firm*—File-EE-Patents.com; Jay A. Chesavage

(57) ABSTRACT

A memory controller for a wireless communication system comprises a packet buffer write system and a packet buffer read system. The packet buffer write system places packets including packet header and packet data into a packet buffer. The packet buffer read system removes packets including a packet header and packet data from a packet buffer. The packet buffer is arranged into a plurality of packet buffer memory slots, each slot comprising a descriptor status array location including an availability bit set to "used" or "free", and a packet buffer memory location comprising a descriptor memory slot and a data segment memory slot. The descriptor memory slot includes header information for each packet, and the data segment memory slot includes packet data. The memory controller operates on one or more queues of data, and data is placed into a particular queue in packet memory determined by priority information derived from incoming packet header or packet data. Data is removed from packet memory based on which queue the data may be found in. The queues are based on a priority system, where one queue receives priority over another queue for data reception and transmission.

20 Claims, 8 Drawing Sheets

*Figure 5*
Single Queue Packet Memory

*Figure 6*

*Figure 7*
Multiple Queue Packet Memory

PACKET BUFFER MANAGEMENT APPARATUS AND METHOD

The present application is a divisional application of Ser. No. 10/680,660 filed on Oct. 6, 2003, now U.S. Pat. No. 7,296,100 now issued.

FIELD OF THE INVENTION

The invention relates to a packet buffer management system for the handling the reception and transmission of data packets from a shared memory buffer. A host and a media access controller share a packet memory, and implement a plurality of queues to enable the efficient sharing of a common memory.

BACKGROUND OF THE INVENTION

Figure 1:
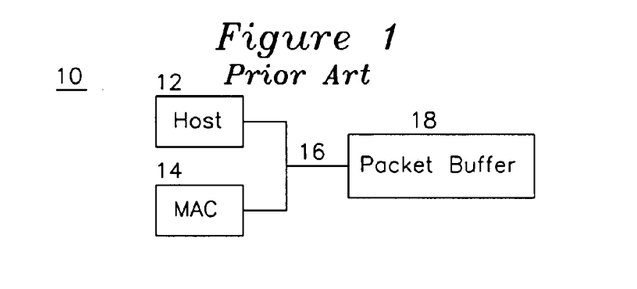
FIG. 1 is a prior art block diagram of a packet buffer coupled to a host and a Media Access Controller (MAC).

Network systems typically have a media access controller (MAC), which receives packets from a physical media such as twisted pair copper wire in the case of IEEE 802.3 commonly known as copper ethernet, or from a wireless front end which converts RF signals into packets as in the case of IEEE standard 802.11, commonly known as wireless ethernet. The MAC provides the interface from a variety of physical interfaces and produces a single interface for receiving and transmitting packets. A host is a function or device which receives and transmits packets, typically from some sort of client or server application software program. Each MAC and host interface may generate or accept packets at different times, and at different rates. The balance of packets which are received from one interface before being handled by the other interface are stored in a packet buffer. FIG. 1 shows the arrangement of a Host 12, a MAC 14, and a packet buffer 18, wherein they share an interface 16. A well-known problem in the area of networking is the sharing of this interface 16 among a plurality of host and MAC devices. The PCI bus specification from PCISIG (www.pci.org) is one example of a shared bus which was developed for applications where there are multiple devices sharing a pooled memory resource, and is one of the prior art solutions to the interface 18 of FIG. 1. Each new version of PCI provides greater bandwidth to support each new generation of higher speed ethernet adapters. For example, is currently possible to place many gigabit ethernet devices on a shared memory 18 in an Intel cpu-based host, or personal computer (PC) 12.

Advances in wireless communications have provided a different challenge from those presented by high speed ethernet connections. Each wireless device represents a lower speed connection, and as portable devices, the system power budget must be carefully managed. For these devices, a lower complexity interface translates into lower power and longer battery life. Additionally, the quality of service requirements are different for wireless devices compared to ethernet devices. When the reliability or bandwidth of the channel degrades, ensuring that high priority traffic continues to receive the highest quality of service at the expense of competing streams of traffic becomes very important. It is desired to have a communications interface with the following features:

a) a shared bus and shared memory for moving data from a host to a MAC;

b) separation of memory allocation into a plurality of separate queues;

c) separation of packet memory into three coupled entities known as a packet memory slot, each packet memory slot comprising a descriptor status bit which provides a single-bit representation of the availability of the present packet memory slot, a descriptor memory location, and a data segment memory location.

d) a plurality of queues, each queue comprising a plurality of packet memory slots.

OBJECTS OF THE INVENTION

A first object of the invention is a packet memory system having a plurality of memory slots, each packet memory slot comprising a descriptor status bit, a descriptor memory location, and a data segment memory location.

A second object of the invention is a packet buffer write system which handles writing packets into packet memory comprising a plurality of packet memory slots, each packet memory slot including a descriptor status array slot and a packet buffer slot which includes a descriptor memory location and a data segment memory location.

A third object of the invention is a packet buffer read system which handles reading packets from a packet memory comprising a plurality of packet memory slots, each packet memory slot including a descriptor status array slot and a packet buffer slot which includes a descriptor memory location and a data segment memory location.

a fourth object of the invention is a process for writing packets into a packet memory comprising a plurality of packet memory slots, each packet memory slot including a descriptor status array slot and a packet buffer slot which includes a descriptor memory location and a data segment memory location.

a fifth object of the invention is a process for reading packets from a packet memory comprising a plurality of packet memory slots, each packet memory slot including a descriptor status array slot and a packet buffer slot which includes a descriptor memory location and a data segment memory location.

SUMMARY OF THE INVENTION

A packet memory system comprises a plurality of packet memory slots, each slot comprising a descriptor status bit, a descriptor memory location, and a data segment memory location. The descriptor status bit indicates the availability of the memory slot, and the descriptor memory location carries packet header information and a pointer to the next descriptor, while the data segment memory location carries the actual packet data. Since each packet memory slot of the packet memory system is a fixed size, the bindings between each descriptor status bit, descriptor memory location, and data segment memory location are fixed and easily computed from the descriptor status bit. In this manner, the availability of a particular memory slot by reading a status bit enables the immediate access to that associated memory slot by either a host memory controller or a MAC memory controller. A plurality of memory slots may be organized into one or more queues to support a plurality of priorities for packet transmission and reception.

A process for a host transmit controller 24 writing packets into a packet buffer 28 for removal by a MAC transmit controller 90 is performed as follows: initially, a MAC read pointer 86 and a host write pointer 22 are initialized to point to the same memory slot. Upon receipt of host packets to be written into the packet buffer 28, a next host controller 40 searches the descriptor status array 44 from a first direction to locate the first available memory slot, sets the descriptor status array 44 bit for the new memory slot to "used", writes the location of this slot into the "pointer to next descriptor"

field of the current descriptor, and writes the packet header information into the new descriptor slot and the data into the associated new data segment memory slot. This process continues for each new packet received, until the host write sequence completes, and the host_write_ptr 22 is set with the address of the last descriptor written.

A process for a MAC Rx controller 90 reading packets from the packet buffer 28 written as described above comprises reading the MAC_read_ptr 86 and associated data segment memory location, clearing the associated descriptor status bit, following the "pointer to next descriptor" of the current descriptor, and updating the MAC read pointer until the MAC read pointer equals the value of the host write pointer. At this point, the MAC has read all of the information in the packet memory, and the availability bits of the descriptor status array 44 have been cleared, indicating availability for reuse.

The process for the MAC writing packets to be read by the host works in an analogous way, however the next MAC controller 48 searches the descriptor status array 44 in a second direction opposite to the first direction of the next host controller 40 when searching for a location to write. In this case, a MAC write pointer 34 and a host read pointer 62 are initialized to point to the same memory slot opposite the location used for the MAC read pointer 86 and host write pointer 22 described earlier. Upon reception of MAC write packets, the MAC Rx controller searches the descriptor status array opposite the first direction described earlier to locate the first available memory slot, writes this location into the "pointer to next descriptor" field of the current descriptor location, and then writes the header information into the next descriptor and the data into the associated data segment memory. This process continues for each new memory required, until the MAC write sequence completes, and a MAC write register is set with the address of the last descriptor written.

A process for a host reading packets from the packet memory 28 written as described above comprises reading the host read pointer 62, using this address to read the associated descriptor memory location and associated data segment memory location, clearing the associated descriptor status bit, following the "pointer to next descriptor" of the current descriptor, and updating the host read pointer 62 until the host read pointer 62 equals the value of the MAC write pointer 34. At this point, the host has read all of the information in the packet memory, and the availability bits of the descriptor status array have been cleared, indicating availability for reuse.

This process may be implemented by several queues, each queue with its own set of MAC and HOST read and write pointers, and each accessing its own memory slots which are allocated within the packet memory.

DETAILED DESCRIPTION OF THE INVENTION

In the prior art FIG. 1, the packet buffer 18 is used as buffer storage for packets leaving the host 12, destined for the MAC 14, which are then transmitted via ethernet for IEEE 802.3, or transmitted via wireless ethernet for the case of IEEE 802.11. The packet buffer is also used to store packets arriving from the MAC 14 and destined for the host 12. Typically, the host 12 has a higher bandwidth for writing data to the packet buffer 18 than does the transmitting channel of the MAC 14 to the ethernet media. In opposite fashion, the MAC 14 receives frames from ethernet media at a low bandwidth rate for placement into the packet buffer 18, and the host 12 removes them from the packet buffer 18 for processing by applications. In this manner, the MAC 14 is writing packets into packet buffer 18 for removal by the host 12, and the host 12 is writing packets into the packet buffer 18 for removal by the MAC 14.

Figure 2:
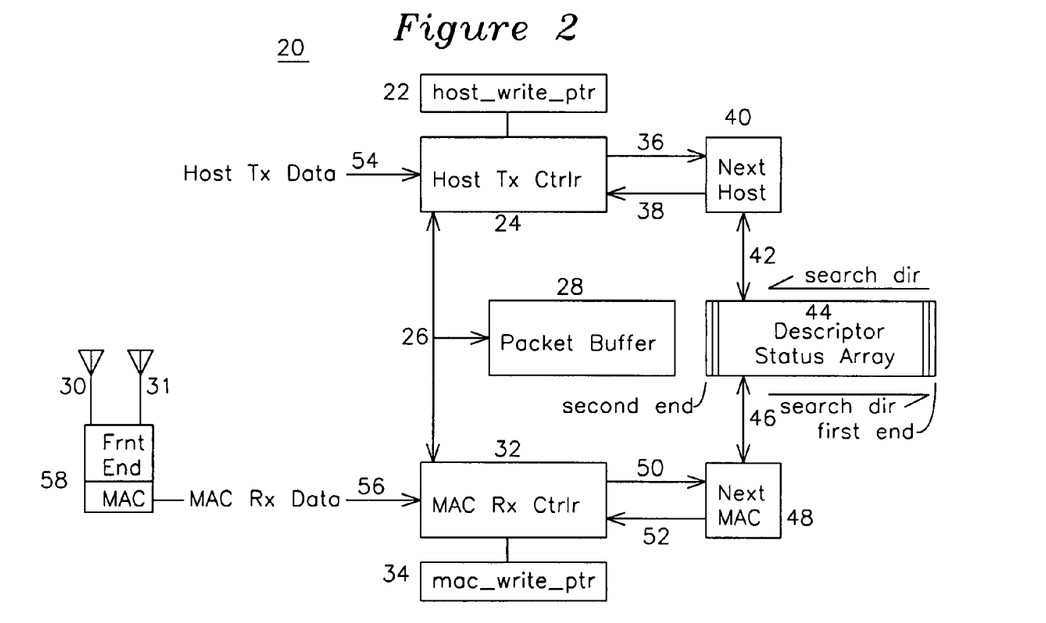
FIG. 2 is the block diagram for a packet buffer write system for writing packets into a packet buffer.

FIG. 2 shows a packet buffer write system 20. The packet Buffer 28 receives packets from a Host Tx Controller 24 via a packet buffer interface bus 26. The sequence of operation for the Host Tx Controller 24 is as follows:

0) Initially, the host_write_ptr 22, which is used to point to the last used host write memory location, is initialized to point to an available location at a first end of the descriptor status array 44, and a pointer described later in conjunction with FIG. 3, MAC_read_ptr, is set to this same location. This initialization is only performed at the initial startup of the controller, typically at power-on, or reset.

Upon receipt of a packet on Host Tx Data 54, the following sequence is performed:

1) Host Tx Controller 24 receives new Host Tx Data 54, and sends a query to the Next Host controller 40 over connection 36.

2) The Next Host controller 40, finds the first available memory slot in packet buffer 28 by examining descriptor status array 44. Descriptor status array 44 is a linear array of bits, where each bit indicates the availability of a memory slot in the packet buffer 28 with the indication that an associated packet buffer 28 memory slot is "free" or "used". The Next Host Controller 40 queries the Descriptor Status Array in a first search direction starting from a first end, and upon finding a location set as "free", thereafter changes this same bit to "used" and returns the location of the available memory slot to the Next Host Controller 40 over interface 42.

3) Next Host Controller 40 returns this location to the Host Tx Controller on bus 38, and the Host Tx Controller 24 writes the packet header information in descriptor memory part of the memory slot, and the packet data information into a data segment memory part of the memory slot.

4) The host_write_ptr 22 is updated to point to the new packet buffer memory slot as was assigned in step 2.

The function of the MAC Rx Controller 32 is similar to the Host Tx Controller 24, and may be described as follows:

0) Initially, the MAC_write_ptr 34, which is used to point to a second end opposite the first end of the descriptor status array 44 is initialized to the second end of descriptor status array 55, and a pointer described later in conjunction with FIG. 3, host_read_ptr 62, is set to this same location. This operation is only performed at the initial startup of the controller, typically at power-on, or reset.

Upon receipt of a packet MAC Rx Data 56, the following sequence is performed:

1) MAC Rx Controller 32 receives new MAC Rx Data 56, and sends a query to the Next MAC controller 48.

2) The Next MAC controller 48 finds an available memory slot in packet buffer 28 by examining descriptor status array 44. Descriptor status array 44 is the one-bit array described earlier, where each bit indicates the availability of a memory slot in the packet buffer 28 with the indication that the associated memory slot in packet buffer 28 is "free" or "used". The Next MAC Controller 40 queries the Descriptor Status Array in a second search direction opposite the first search direction described above, and upon finding a bit noted as "free", thereafter changes this same bit to "used" and returns the location of the available memory slot to the Next MAC Controller 48.

3) Next MAC Controller 48 returns this location to the MAC Rx Controller 32 on bus 52, and the MAC Rx Controller 32 writes the packet header information in the descriptor memory location of the memory slot, and the packet data information into a data segment memory location of the memory slot.

4) The MAC_write_ptr 34 is updated to point to the new packet buffer memory slot as was assigned in step 2.

In this manner, packets to be placed in host memory are very quickly assigned a packet memory slot, and the memory slots for Host Tx Data 54 and MAC Rx Data 56 are assigned to opposite ends of the available memory in packet buffer 28, thereby reducing the contention for same slots and optimizing memory utilization.

Figure 3:
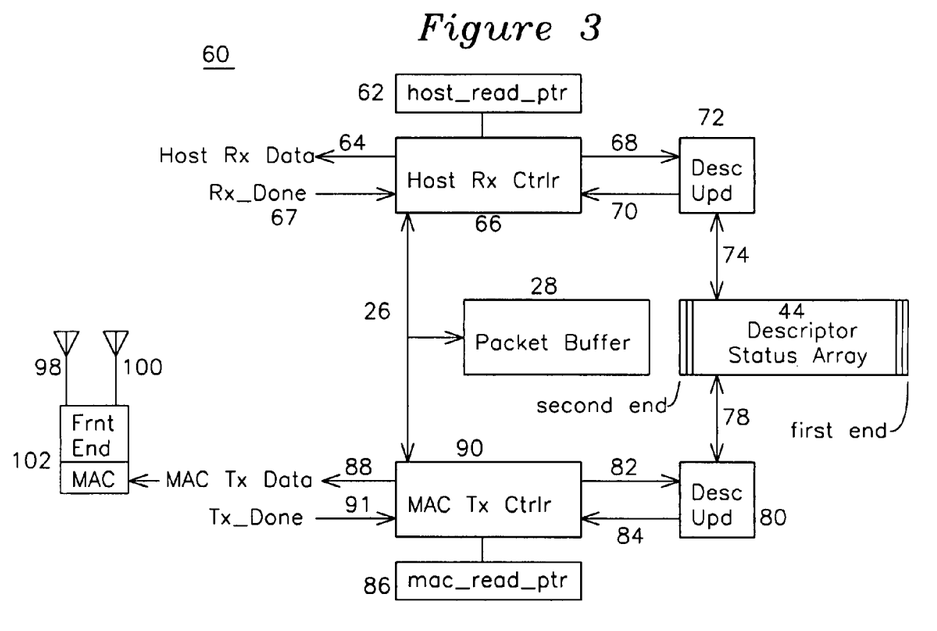
FIG. 3 is the block diagram for a packet buffer read system for reading packets from a packet buffer.

FIG. 3 shows the packet buffer read system 60, which removes packets from the packet buffer 28 and delivers them to either Host Rx Data 64, or the MAC Tx Data 88. The Host Rx Controller 66 receives a Rx Done signal 67 which is asserted when the Host Rx Controller 66 has removed all packets placed in the packet buffer 28 by the MAC Rx Controller 32 of FIG. 2. When a packet is removed from the packet buffer 28, the corresponding memory slot is marked as free in the descriptor status array 44. The descriptor status array 44 and packet buffer 28 are shared with the packet buffer write system 20 of FIG. 2. As described earlier, each memory slot comprises a memory descriptor and data segment memory which are stored in packet buffer 28, and an associated descriptor status array which indicates whether each slot is "used" or "free", as described in FIG. 2. The operation of the packet buffer read system 60 is as follows:

0) During the initialization time as described for the packet buffer write system of FIG. 2, the host_read_ptr 62 is set to the same location as the MAC_write_ptr 34 of FIG. 2. Similarly, the MAC_read_ptr 86 is set to the same location as the host_write_ptr 22 of FIG. 2. The comparison of pointers host write ptr 22 and MAC_read_ptr 86 is used to form the signal Tx_Done 91, which is asserted when the two pointers have the same value. The comparison of pointers host_read_ptr 62 and MAC_write_ptr 34 is used to form the signal Rx_Done 67, which is asserted when these two pointers have the same value.

1) If Rx_Done 67 is not asserted, the Host Rx Controller 66 reads the packet buffer 28 memory slot pointed to by the host_read_ptr 62. The memory slot pointed to by the host_read_ptr 62 comprises descriptor memory location and data segment memory location stored in packet buffer 28, and the descriptor status array 44. The descriptor memory location includes a pointer to the next memory slot.

2) The host rx controller 66 reads the descriptor for the slot pointed to by host_read_Ptr 62, which includes a pointer to the next descriptor location, the actual packet data held in a data segment memory location, and the descriptor status array bit.

3) The host_read_ptr 62 refers to a "present memory slot", while the pointer to the next location in the descriptor of the "present memory slot" points to the "next memory slot". The host_read_ptr 62 is set to the "next memory slot", the data segment memory associated with the "present memory slot" is sent to the host Rx Data interface along with the packet header information stored in the corresponding descriptor memory location, and the status bit associated with the "present memory slot" is set to "free" after the data segment memory is read.

The MAC Tx Controller 90 works in an analogous way for packets placed in the packet buffer 28 by the Host Tx Controller 24 of FIG. 2. The MAC Tx Controller 90 receives a Tx Done signal 91 which is asserted when the MAC Tx Controller 90 has removed all packets placed in the packet buffer 28 by the Host Tx Controller 24 of FIG. 2. When a packet is removed from the packet buffer 28, the corresponding memory slot is marked as free in the descriptor status array 44. The descriptor status array 44 and packet buffer 28 are shared with the packet buffer write system 20 of FIG. 2. As described earlier, each memory slot comprises a memory descriptor and data segment memory which are stored in packet buffer 28, and an associated descriptor status array 44 which indicates whether each slot is "used" or "free", as described in FIG. 2. The operation of the packet buffer read system 60 is as follows:

0) During the initialization time, the MAC_read_ptr 86 is set to the same location as the host_write_ptr 22 of FIG. 2, as was described earlier. The comparison of pointers host_write_ptr 22 and MAC_read_ptr 86 is used to form Tx_Done 91, as described earlier.

1) If Tx_Done 91 is not asserted, the MAC Tx Controller reads the packet buffer 28 memory slot pointed to by the MAC_read_ptr 86. The memory slot pointed to by the MAC_read_ptr 86 comprises a descriptor memory location and a data segment memory location stored in packet buffer 28, and the descriptor status array 44. The descriptor memory includes a pointer to the next memory slot.

2) The MAC Tx controller 90 reads the descriptor for the slot pointed to by MAC_read_ptr 86, which includes a pointer to the next location, the actual packet data held in a data segment memory location, and the descriptor status array bit.

3) The MAC_read_ptr 86 refers to a "present MAC memory slot", while the pointer to the next location in the descriptor of the "present MAC memory slot" points to the "next MAC memory slot". The MAC read_ptr 86 is set to the "next MAC memory slot", the data segment memory associated with the "present MAC memory slot" is sent to MAC Tx Data 88, and the status bit associated with the "present MAC memory slot" is set to "free" after the data segment memory is read.

Figure 4:
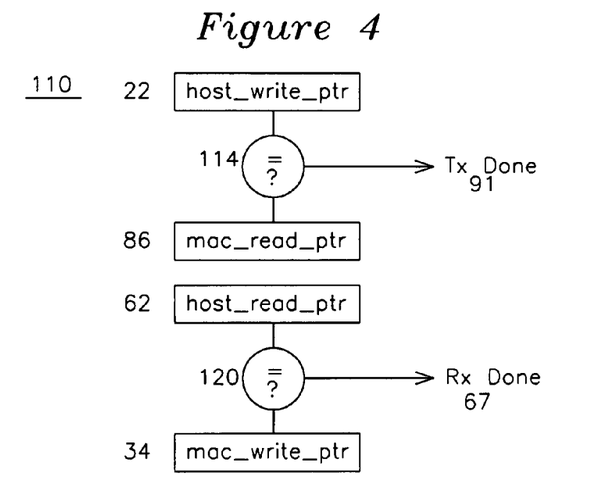
FIG. 4 is a block diagram showing the generation of Tx_Done and Rx_Done signals.

FIG. 4 shows the generation of Tx_Done 91 and Rx_Done Tx_Done 91 is asserted when the MAC_read_pointer 86 is equal to the host_write_pointer 22. From the description of FIGS. 2 and 3, it can be seen that each new packet from the host results in the assignment of the packet to one or more memory slots, each causing the updating of the pointer host_write_ptr 22. As packets are removed from the packet buffer and transmitted as MAC Tx Data 88, the MAC_read_ptr 86 is updated until the MAC_read_ptr 86 is equal to the host_write_ptr 22, which causes the assertion of Tx_Done 91 by comparator 114. Similarly, Rx_Done 67 is asserted when the host_read_pointer 62 is equal to the MAC_write_pointer by comparator 120. From the description of FIGS. 2 and 3, it can be seen that each new packet from the MAC results in the assignment of the packet to one or more memory slots, each causing the updating of the pointer MAC_write_ptr 34. As packets are removed from the packet buffer and transmitted as Host Rx Data 64, the host_read_ptr 62 is updated until the host_read_ptr 62 is equal to the MAC_write_ptr 34, which causes the assertion of Rx_Done 67. In this manner, the write pointers host_write_ptr 22 and MAC_write_ptr 34 are advancing to new locations (from opposite directions), and the read pointers MAC_read_ptr 86 and host_read_ptr 62 are lagging behind until all data is removed from the buffer, at which point the respective Tx_Done 91 and Rx_done 67 signals are asserted, and the respective MAC Tx Controller 90 and Host Rx Controller 66 stop sending data to their respective output ports MAC Tx Data 88 and Host Rx Data 64.

Figure 5:
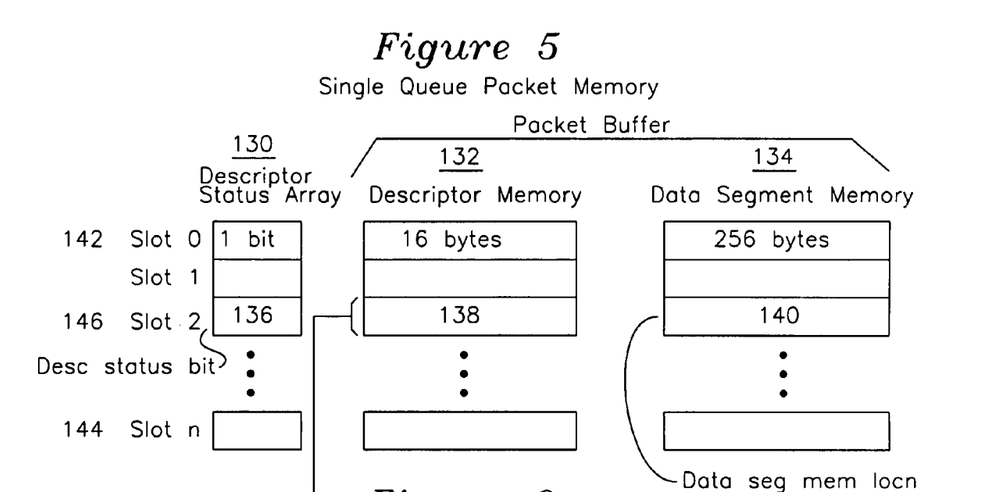
FIG. 5 shows the organization of the packet memory of FIGS. 2 and 3 for a single queue.

FIG. 5 shows the organization of packet buffer 28 for a single queue. As described earlier, the packet buffer 28 comprises a plurality of memory slots from slot 0 142 through slot n 144, where n can be any integer greater than 1. Each memory slot has identical structure comprising a descriptor status bit, a descriptor memory location, and a data segment memory location. For example, memory slot 2 146 includes a descriptor status bit 136 which indicates that this memory slot is "free" or "used", descriptor memory location 138 which contains header and pointer information, as will be described later, and data segment memory location 140, which contains the actual packet data. The plurality of memory descriptor status bits from all slots comprises descriptor status array 130, the plurality of memory descriptors locations forms descriptor memory 132, and the plurality of data segment memory locations forms data segment memory 134. The uniform size of each constituent of a memory slot enables the rapid computation of location from a descriptor status array bit. For example, if each descriptor memory location is 16 bytes long, and each data segment memory location is 256 bytes long, and there are n memory slots, the required memory is n bits of descriptor status array, and n*(16+256) bytes of descriptor memory and data segment memory. If the descriptor memory 132 and data segment memory 134 are placed contiguously in static ram (sram) starting at a location 0, then descriptor status array bit m (bounded from 0 through n) refers to descriptor memory location byte 16*m, and data segment memory location 16*n+256*m. In this manner, the address locations for descriptor memory and data segment memory can be very quickly computed from the descriptor status array bit. The descriptor status array 130 comprises a linear arrangement of individual bits which each indicate whether the associated memory slot is "free" or "used", and this descriptor status array 130 was shown as descriptor status array 44 of FIGS. 2 and 3.

It should be pointed out that FIG. 5 illustrates a single queue which requires two pointer pairs host_write_ptr 22, MAC_read_ptr 86, and MAC write_ptr 34, host_read_ptr 62. At initialization, host_write_ptr 22 and MAC_read ptr 86 would both point to a same first end of the descriptor status array 0, while the MAC_write_ptr 34 and host_read_ptr 62 would point to the same location on the opposite, or second end of the descriptor status array n. Each single queue would comprise 4 pointers managed as described in FIGS. 2 and 3.

Figure 6:
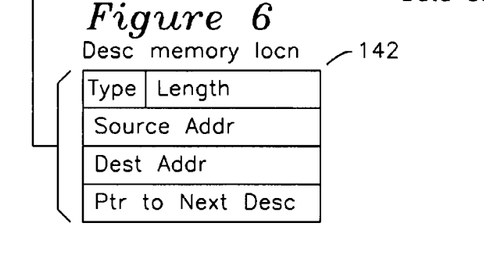
FIG. 6 shows the detail for a single location of the descriptor memory of FIG. 5.

FIG. 6 shows the detail of a descriptor memory location from FIG. 5. A descriptor memory location 142 includes a packet header which comprises a type field, a length field, a source address, and a destination address. The descriptor memory location 142 also includes a "pointer to next" field, which contains the address of the next descriptor when multiple descriptors are chained together, as will be described later. The type field describes the type of data packet, and the length is the length of the data in the associated data segment memory location. The source and destination addresses are layer 2 addresses well known in ethernet communications.

Figure 7:
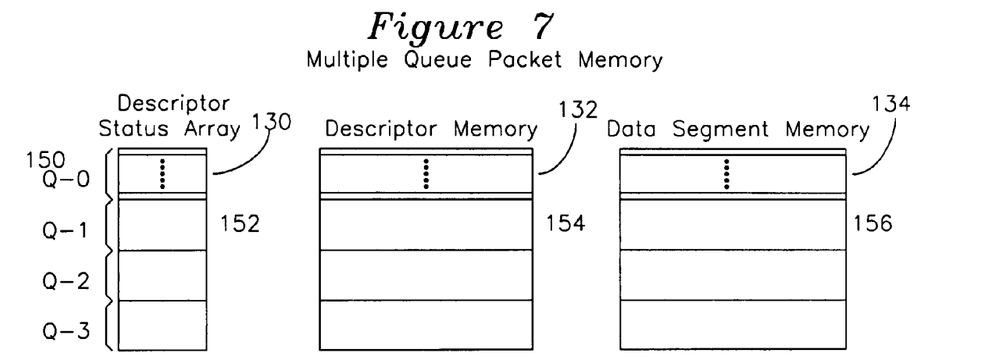
FIG. 7 shows the organization of packet memory of FIG. 5 when there are multiple queues.

FIG. 7 shows the memory organization for a multiple queue memory system, which comprises multiple instances of the queue of FIG. 5. For a four queue system, each queue operates in its own memory space concatenated onto the previous queue. For example, queue 0 150 would comprise descriptor status array 130, descriptor memory 132, and data segment memory 134, and queue 1 would comprise descriptor status array 152, descriptor memory 154, and data segment memory 156, respectively. Queues 1 through 3 are similarly arranged queues. The multiple queues are typically formed by concatenating the descriptor memory for all of the queues, the data segment memory for all of the queues, and the descriptor status array for all of the queues. For the case of data segment memory pooled one queue after another, followed by data segment memory pooled one queue after another, the descriptor status array can still be used to address each memory segment. For example, if there are q queues, and we are addressing a particular queue k(0<=k<=q−1), and n data slots in each queue, and the memory is organized as shown in FIG. 5, then there are n*q bits of descriptor status array. Where descriptor memory starts at location 0, any descriptor status array bit m (0>=m>=n*q−1) for a specific queue k then refers to descriptor memory byte address m*k*16. Where data segment memory starts at the end of descriptor memory, any data segment memory location can be addressed as n*q*16+m*k*256. In this manner, multiple queues maybe maintained by a single packet buffer write system 20 and a single packet buffer read system 60 by adding additional independent queues as described above and including priority information to the host Tx Data 54 and MAC Rx Data 56 of FIG. 2, and carrying this priority information to next host controller 40 and next mac controller 48, respectively. The Host Tx Controller 24 and MAC Rx Controller 32 would use the priority information to manage the separate queues. In the case of contention, or bandwidth limiting, the highest priority queue would receive most preferential treatment, as is known in the art of queuing theory. Similarly, in packet buffer read system 60 of FIG. 3, the Host Rx Controller 66 and MAC Tx Controller 90 would remove packets from each separate queue based on the priority of each queue. Commonly in wireless systems, the memory bandwidth of bus 26 to packet buffer 28 is not a constraint, but rather the PHY transmit channel 102, representing the bandwidth available for MAC Tx Data 88. When channel bandwidth is poor, outgoing transmissions are not received, and requests for retransmission of lost data occur. In this case, transmit data in lower-priority queues remains in the packet buffer 28, until the higher priority data is successfully transmitted and acknowledged by the receiver. Often, this means that the lower-priority queues may overflow and data may be lost, however the highest priority queue will continue to receive all of the available bandwidth. There are many priority algorithms which are part of the prior art of queuing theory, as is known to one skilled in the art. It is clear that any existing priority scheme may be used, including weighted round robin, head-of-line priority queues, pre-emptive priority queues, service-time priority queues, or any other prior art priority queuing method. The advantage of maintaining multiple queues as shown in FIG. 7 is the ability to associate different quality of service to each queue. For example, queue 0 could represent the highest quality of service, taking priority over queue 1, etc. In this manner, when the communications channel becomes blocked or the bandwidth is momentarily limited, queue 0 has first priority for transmission and reception. The management of separate queues is believed to be of particular value in wireless networks, where the bandwidth of the channel is subject to change over time because of multi-path reflections and signal fading, for example.

Figure 8A:
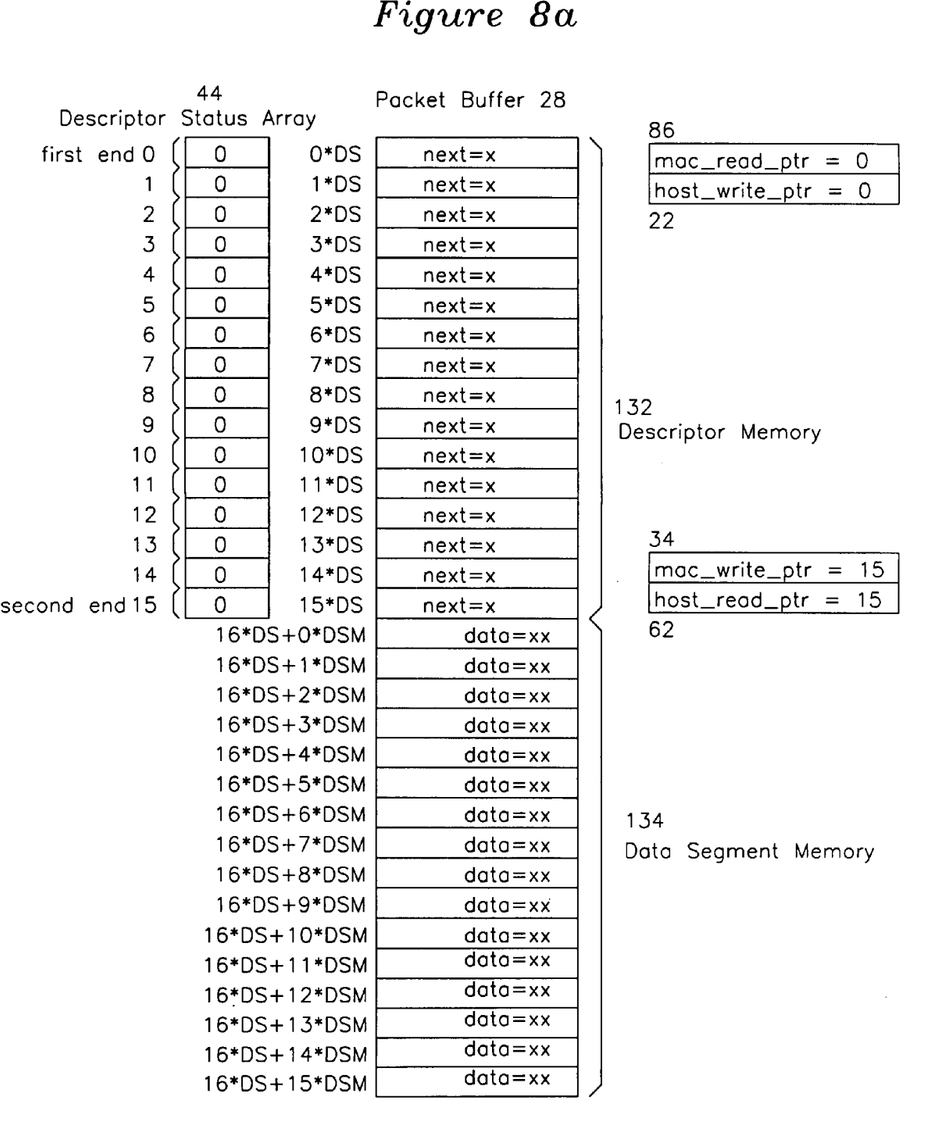
FIG. 8a shows the descriptor status array, descriptor memory, data segment memory, and pointers after initialization.
Figure 8B:
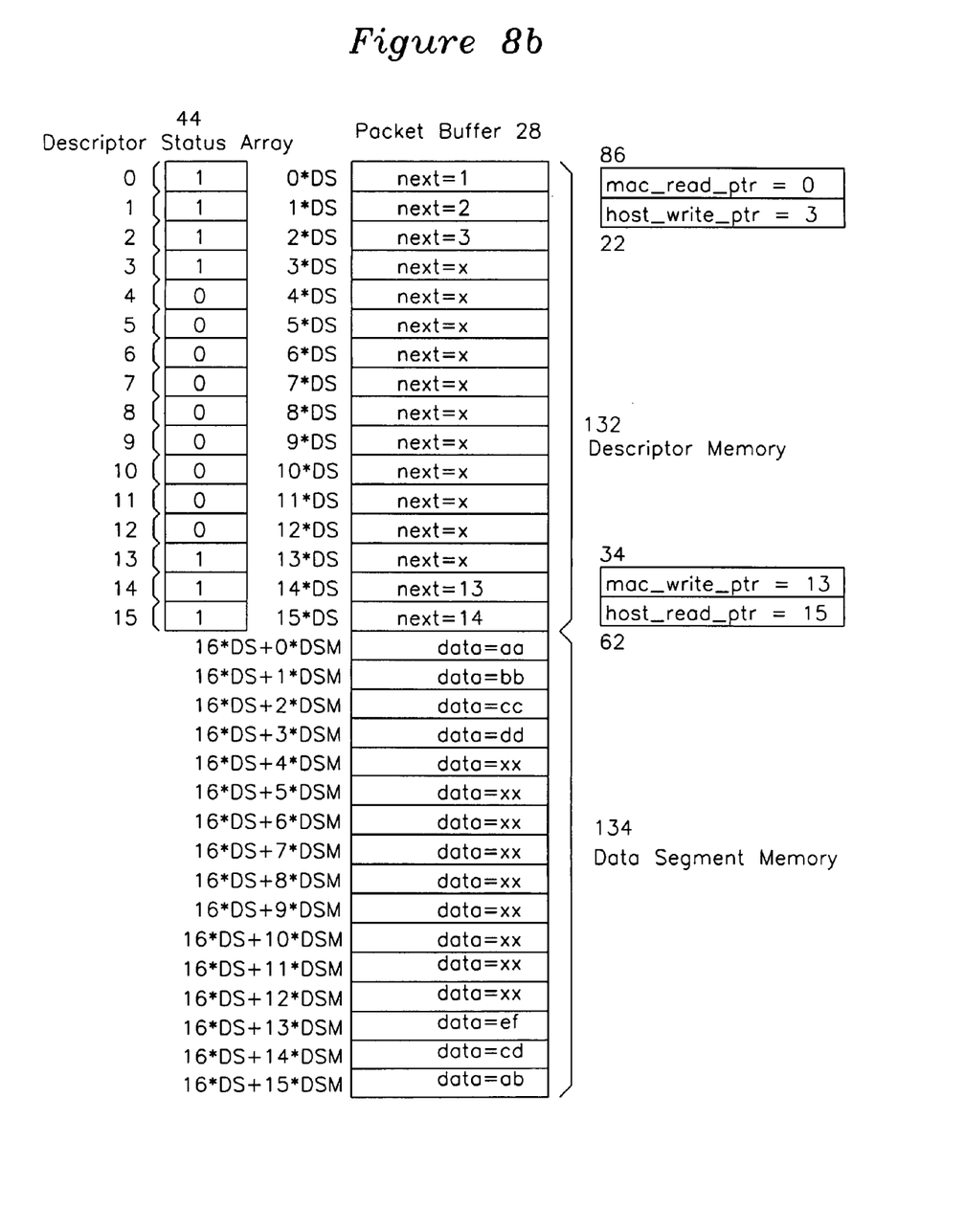
FIG. 8b shows the descriptor status array, descriptor memory, data segment memory, and pointers after receipt of data packets from the MAC and host.
Figure 8C:
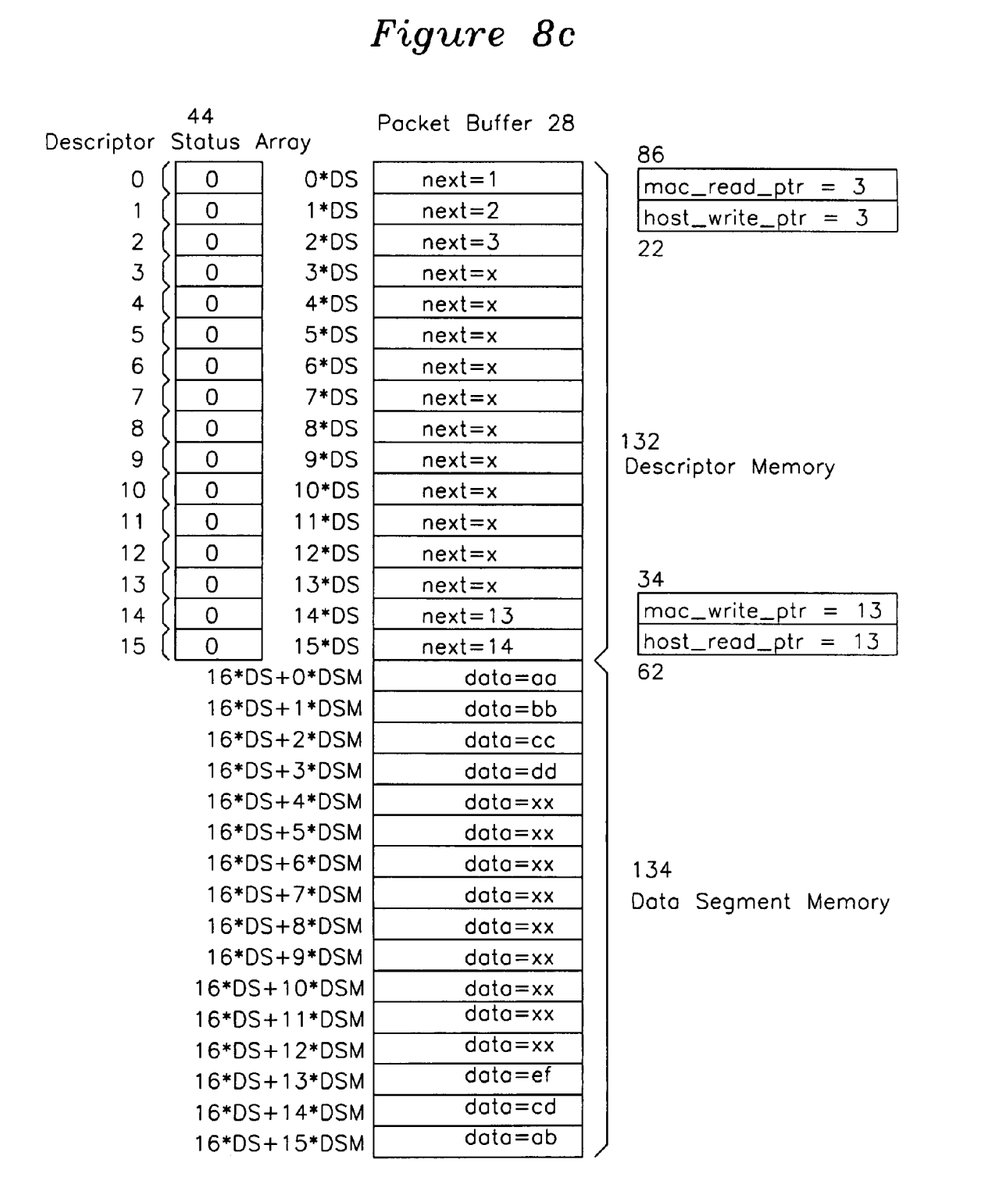
FIG. 8c shows the descriptor status array, descriptor memory, data segment memory, and pointers after data from the packet buffer is moved by the Host Rx Controller and MAC Tx Controller.

FIGS. 8a, 8b, and 8c show the memory arrangement for a single queue at three separate times, respectively: at initialization, after reception of packets from the MAC and host, and after the buffer is emptied. Packet memory comprises the descriptor status array 44 and packet buffer memory 28, which includes descriptor memory 132 and data segment memory 134. FIG. 8a shows initialization, when MAC_read_ptr 86 and host_write_ptr 22 are set to the first memory slot location at a first end, shown as slot 0, and the host_read_ptr 62 and MAC_write_ptr 34 are both set to the last memory slot location at a second end, shown as slot 15. The Descriptor Status Array bits 44 are all reset to 0 indicating "free", and the descriptor memory 132 and data segment memory 134 may be optionally initialized to predetermined values. Pointer pair host_read_ptr 62 and MAC_write_ptr 34 are equal with the value 15, causing Rx_Done 67 of FIGS. 4 and 3 to be asserted by comparator 120, which indicates to Host Rx Controller 66 that no packets are available to be removed from packet buffer 28. Similarly, pointer pair host_write_ptr 22 and MAC_read_ptr 86 of FIG. 8a are equal with the value 0, causing Tx_Done 91 of FIGS. 4 and 3 to be asserted by comparator 114, which indicates to MAC Tx Controller 90 that no frames are available for removal from packet buffer 28.

FIG. 8b shows the state of the descriptor status array 44, descriptor memory 132, and data segment memory 134 after the receipt of packets with data "aa", "bb", "cc", and "dd" from the host Tx controller 24 and packets with data "ab", "cd", and "ef" from the MAC Rx controller 32. Each time a packet is received from the host Tx Controller 24, the current memory slot of the descriptor status array is changed from "free" to "used", the header information is placed in the corresponding slot of descriptor memory 132, the packet data is placed in the corresponding slot of data segment memory 134, and a search is conducted in a first direction for the first available memory slot, and this value is written into the "next" field of the descriptor memory 132. In this case, successively memory slots 0, 1, 2, and 3 were written by the host Tx Controller 24 of FIG. 2, resulting in the memory allocation shown in FIG. 8b. The descriptor status array 44 shows each of the 4 slots from the first location is "used". Separately, or concurrently with these host Tx Controller 24 write activities, the MAC Rx controller 32 has also been putting packets into memory using MAC_write_ptr 34. As was described earlier in FIG. 2, the operation of the MAC Rx controller 32 results in a search for available memory using next MAC controller 48, which searches in a second direction opposite the earlier first direction for available memory slots in descriptor status array 44. The successive arrival of data packets "ab", "cd", and "ef" from the MAC is shown in FIG. 8b, resulting in "used" status bits in descriptor status array 44 locations 15, 14, 13, respectively, and the successive updating of "next" in descriptor slots 15 and 14, respectively. Slots 13 and slot 3 of descriptor memory "next" location are left uninitialized since this is the last data present, and the "next location" will be written when a new packet arrives. The next memory location identified by the MAC Rx controller 32 would be written to the "next" value in descriptor memory slot 13, and the next memory location identified by the host Tx controller 24 would be written in the "next" value in descriptor memory slot 3.

FIG. 8c shows the state of the descriptor status array 44, descriptor memory 132, land data segment memory 134 after the data has been read out of packet buffer 28 by host Rx controller 66 and MAC Tx controller 90. The host Rx controller 66 successively reads descriptor memory locations and data segment memory locations pointed to by host_read_ptr 62, clearing the associated descriptor status array bit to "free", and following the descriptor memory 132 "next" pointer until Rx_Done 67 is asserted. Similarly, the MAC Tx controller 90 successively reads descriptor memory and data segment memory locations point to by MAC_read_ptr 86, clearing the associated descriptor status array bit to "free", following the descriptor memory 132 "next" pointer until Tx_Done 91' is asserted. After all of the data has been removed from the packet buffer, the descriptor status array 44 bits are all cleared, and the pointers 62, 34, 22, and 86 point to the last used location, shown in the state of FIG. 8c. As the host Tx controller 24 is searching for the first available location from a first end, and the mac rx controller 32 is searching for first available locations from a second end, the queue makes best use of the available memory slots.

Figure 9:
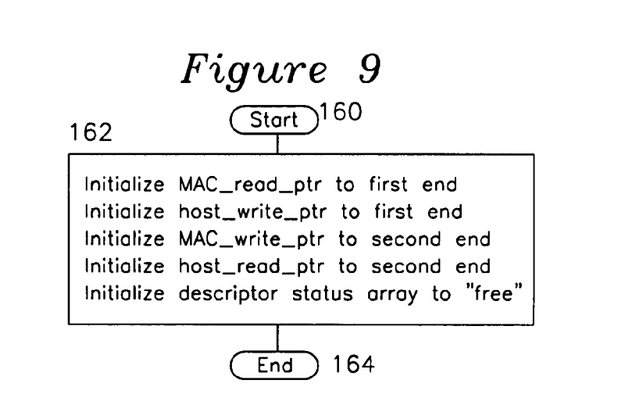
FIG. 9 is the flowchart for the initialization of the packet buffer write system of FIG. 2 and packet buffer read system of FIG. 3.

FIG. 9 shows the initialization algorithm used to initialize the packet buffer write system 20 of FIG. 2 and packet buffer read system 60 of FIG. 3. The initialization is entered in step: 160, and in initialization step 162, the host_write_ptr 22 and MAC_read_ptr 86 are initialized to a first end of the descriptor status array 44, while the host_read_ptr 62 and MAC_write_ptr 34 are initialized to a second end which is opposite the first end of the descriptor status array 44. The initialization terminates in step 164.

Figure 10A:
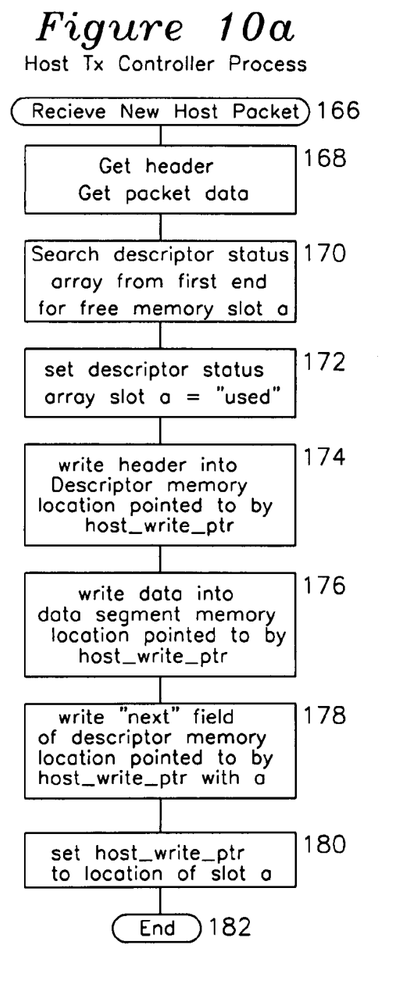
FIG. 10a is the flowchart for the process of the Host Tx Controller of FIG. 2.

FIG. 10a shows the operation of the Host Tx Controller 24. Upon receipt of a new host packet in step 166, the header and packet data are extracted in step 168. The descriptor status array 44 is searched from a first end for the first available memory slot, referred to as "slot a" in step 170. In step 172, slot a is marked as "used", and the header is written into descriptor memory pointed to by the host_write_ptr 22 in step 174. The associated data is written into the same memory slot, data segment location pointed to by host_write_ptr 22 in step 176. In step 178, the address "slot a" is written into the "next" field of the data descriptor memory, and in step 180, the host_write_ptr 22 is updated with the value of "slot a". The process terminates at step 182 until the next host packet is received in step 166.

Figure 10B:
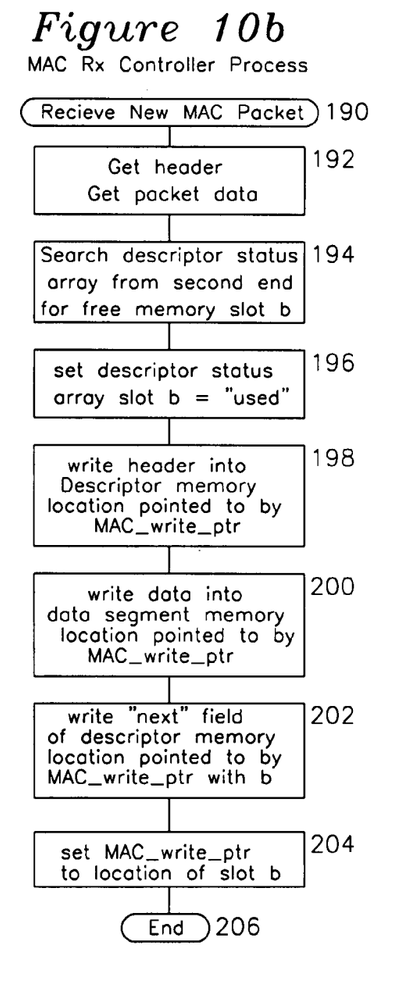
FIG. 10b is the flowchart for the process of the MAC Rx controller of FIG. 2.

FIG. 10b shows the operation of the MAC Rx Controller 32. Upon receipt of a new host packet in step 190, the header and packet data are extracted in step 192. The descriptor status array 44 is searched from a second end opposite the first end of FIG. 10a for the first available memory slot, referred to as "slot b" in step 194. In step 196, slot b is marked as "used", and the header is written into descriptor memory pointed to by the MAC_write_ptr 34 in step 198. The associated packet data is written into the same memory slot, data segment location pointed to by MAC_write_ptr 34 in step 200. In step 202, the address "slot b" is written into the "next" field of the data descriptor memory, and in step 204, the MAC_write_ptr 34 is updated with the value of "slot b". The process terminates at step 206 until the next MAC packet is received in step 190.

Figures 11A, 11B:
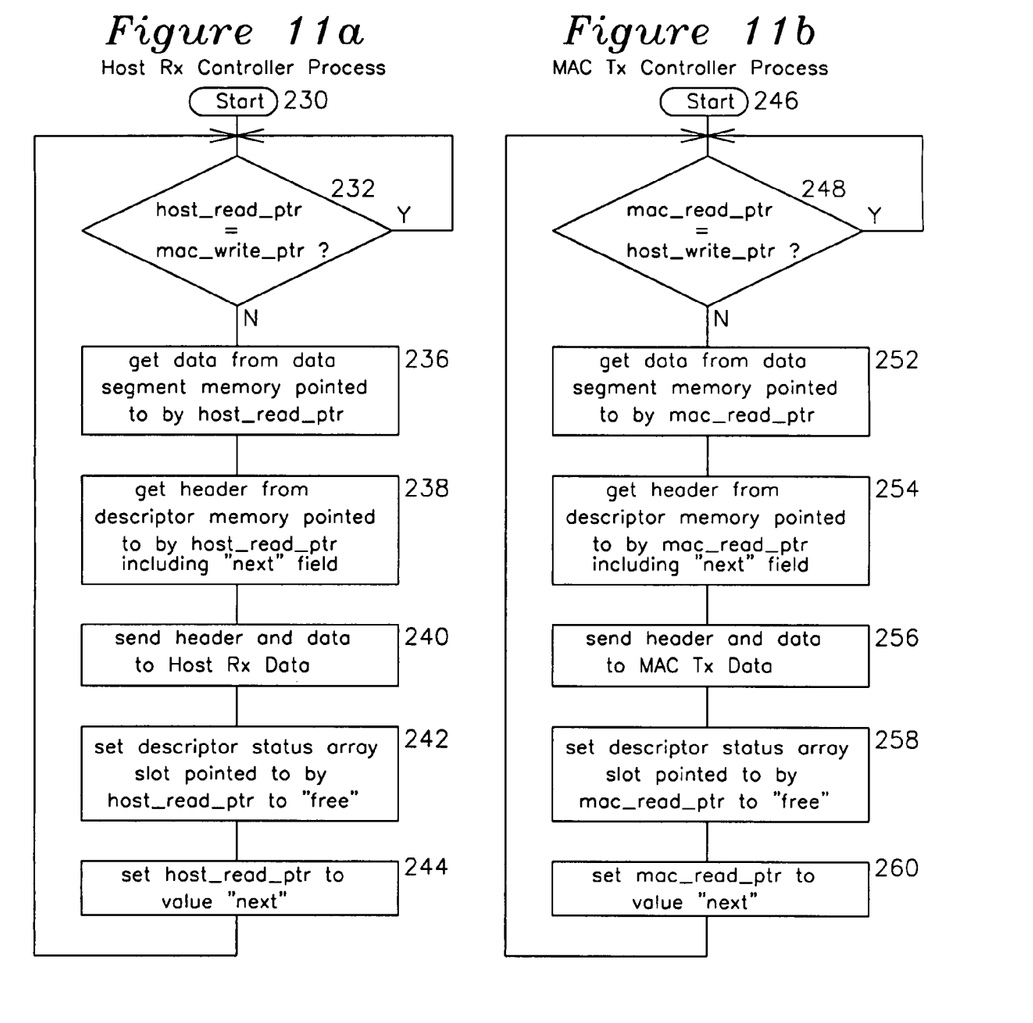
FIG. 11a is the flowchart for the process of the Host Rx Controller of FIG. 3.
FIG. 11b is the flowchart for the process of the MAC Tx Controller of FIG. 3.

FIG. 11*a* shows the process used by the Host Rx Controller 66 to remove packets from the packet buffer 28. A continuous comparison is done between the host_read_ptr 62 and MAC_write_ptr 34 in step 232. If they are equal, Rx_Done 67 is asserted and the process returns to step 232 until they are not equal and Rx_Done 67 is not asserted, whereupon the process enters step 236 and uses host_read_ptr 62 to read the data segment memory and reads the header in step 238 as well as the value of the "next" field of the descriptor for the memory slot pointed to by host_read_ptr 62. The header and data are sent to Host Rx Data 64 in step 240. The memory slot pointed to by the host_read_ptr also includes a bit from the descriptor status array 44, which is set to "free" in step 242, and the value "next" that was earlier recovered in step 238 is written into the host_read_ptr 62 in step 244. The process then returns to step 232 in search of additional packets to remove from the packet buffer.

FIG. 11*b* shows the process used by the MAC Tx Controller 90 to remove packets from the packet buffer 28. A continuous comparison is done between the MAC_read_ptr 86 and host_write_ptr 22 in step 248. If they are equal, Tx_Done 91 is asserted and the process returns to step 248 until they are not equal and Tx_Done 91 is not asserted, whereupon the process enters step 252 and uses MAC_read_ptr 86 to read the data segment memory and read the header in step 254 as well as the value of the "next" field of the descriptor for the memory slot pointed to by MAC_read_ptr 86. The header and data are sent to MAC Tx Data 88 in step 256. The memory slot pointed to by the MAC_read_ptr 86 also includes a bit from the descriptor status array 44, which is set to "free" in step 258, and the value "next" that was earlier recovered in step 254 is written into the MAC_read_ptr 86 in step 260. The process then returns to step 248 in search of additional packets to remove from the packet buffer.

We claim:

1. A process for a host a controller having at least one pointer pair, each said pointer pair having a head pointer and a tail pointer, said controller receiving packets from one or more sources and placing them in a memory having a plurality of memory slots, each memory slot including a descriptor status bit having the value FREE or USED, a descriptor memory, and a data segment memory, the process having:

a first step of receiving said packets including a header and packet data;

a second step of searching said memory slots for a current available slot having a said descriptor status bit with the value FREE; setting said descriptor status bit to the value USED; writing said packet header into said current available slot descriptor memory, writing said packet data into said current available slot data segment memory and for any remaining unwritten said packet data, finding a next available memory slot having said descriptor status bit set to FREE, changing said next available slot descriptor status bit to USED, and writing the location of said next available slot into said current available slot descriptor memory, setting associated said tail pointer to said next available slot;

a third step of changing said second step next available slot to said current available slot and repeating said second step and said third step until no unwritten said packet data remains.

2. The process of claim 1 where said first step packet is a wireless packet received from one or more wireless remote systems.

3. The process of claim 1 where said first step packet is a wireless packet received from one or more local media access controllers.

4. The process of claim 1 where said header includes priority information.

5. The process of claim 1 where said second step is performed in a particular priority queue, each said priority queue having its own said descriptor status bits, its own said descriptor memory, and its own said data segment memory.

6. The process of claim 5 where said priority queue is selected based on information for said first step.

7. The process of claim 5 where said priority queue is selected based on information in said packet header.

8. The process of claim 5 where said priority queue is selected based on information in said packet data.

9. The process of claim 5 where the number of said priority queues is 4.

10. The process of claim 1 operating on packets from a wireless communications system.

11. The process of claim 1 where a first said pointer pair corresponds to packets received from a local host, and a second said pointer pair corresponds to packets received from a media access controller processing packets from a remote station, said first pointer pair includes said tail pointer host_write_pointer which indicates a said memory slot corresponding to a last said host packet written, and said second pointer pair includes said tail pointer MAC_write_ptr which indicates the memory slot for a last said media access controller packet written.

12. A process for a controller receiving packets, the packets including a header and data, the packets being received from one or more data inputs, said controller having access to memory, the memory having a plurality of slots, each memory slot including a descriptor status bit having a value FREE or USED, an associated descriptor memory, and an associated data segment memory, the process having the steps:

initializing one or more pointer pairs, each pointer pair having a head pointer and a tail pointer both initialized to a unique memory slot including changing the descriptor status value associated with said memory slot to the value FREE;

upon receiving a packet, associating said packet with a said pointer pair, determining the quantity n of said memory slots required to store said packet, and identifying n said memory slots having a descriptor status value of FREE, including a first slot and a last slot;

storing said packet data in a succession of said n data segment memory slots from said first to said last, and storing the location of a subsequent memory slot in a previous said descriptor memory slot;

changing said associated pointer pair tail pointer to said last memory slot.

13. The process of claim 12 where the number of said pointer pairs is equal to the number of said packet data inputs.

14. The process of claim 12 where at least one said pointer pair and one said packet data input is a media access controller.

15. The process of claim 12 where at least one said pointer pair and one said packet data input is a wireless receiver media access controller.

16. The process of claim 12 where at least two pointer pairs and two said packet data inputs from a media access controller form separate queues with distinct priorities.

17. The process of claim 12 where at least two pointer pairs and two said packet data inputs from a wireless receiver media access controller form queues with separate priorities.

18. The process of claim 12 where at least one said pointer pair operates exclusively from other said pointer pairs and said pointer pair operates within a subset of said memory slots.

19. The process of claim 12 where all said pointer pairs operate exclusively within a subset of said memory slots.

20. A process for a packet storage controller receiving packets from a plurality of sources, each said packet having a header and a payload, the controller coupled to a memory having a plurality of slots, each said memory slot including a descriptor status bit having at least one of the values FREE or USED, a descriptor memory, and a data segment memory, the controller having a plurality of pointer pairs, each pointer pair having a pointer head and a pointer tail, said pointer pairs operating in exclusive subsets within said memory, the process having the steps:

an initialization step of setting each said pointer pair to a said memory slot in a unique said exclusive subset of said memory and setting at least one said descriptor status bit associated with the location for each said pointer pair to FREE;

for each received said packet, associating said packet with an active pointer pair from said pointer pairs, thereafter:

identifying a series of said memory slots including a first slot and a last slot, said memory slots located within said exclusive subset for said pointer pair and having the descriptor status value FREE;

storing said packet payload into said data segment memory, storing said packet header into said descriptor memory, each associated with said memory slot series first slot through said last slot, also storing the location of the next memory slot in the series in the descriptor memory for the previous slot, and updating said active pointer pair tail pointer to said last slot.

* * * * *

UNITED STATES PATENT AND TRADEMARK OFFICE
CERTIFICATE OF CORRECTION

PATENT NO. : 7,464,201 B1  
APPLICATION NO. : 11/803909  
DATED : December 9, 2008  
INVENTOR(S) : Narasimhan Venkatesh and Satya Rao It is certified that error appears in the above-identified patent and that said Letters Patent is hereby corrected as shown below:

Column 7, line 5 "and Rx_Done" should be changed to --and Rx_Done 67--

Column 7, line 29 "and Rx_done 67" should be changed to --and Rx_Done 67--

Column 8, line 52 "and next mac controller" should be changed to --and next MAC controller--

Column 10, line 17 "descriptor memory 132, land data" should be changed to --descriptor memory 132, and data--

Column 10, line 29 "Tx_Done 91' is" should be changed to --Tx_Done 91 is--

Column 10, line 34 "and the mac rx controller" should be changed to --and the MAC Rx controller--

Column 10, line 39-40 "entered in step: 160" should be changed to --entered in step 160--

Column 11, line 46 "A process for a host a controller" should be changed to --A process for a controller--

Signed and Sealed this

Eighth Day of September, 2009

David J. Kappos  
*Director of the United States Patent and Trademark Office*